Nov. 7, 1939.  F. W. SCHWINN  2,178,921
PEDAL
Filed March 3, 1938   3 Sheets-Sheet 1

Inventor:
Frank W. Schwinn
By Williams, Bradbury, McCaleb & Hinkle
Attys.

Nov. 7, 1939.  F. W. SCHWINN  2,178,921
PEDAL
Filed March 3, 1938  3 Sheets-Sheet 2
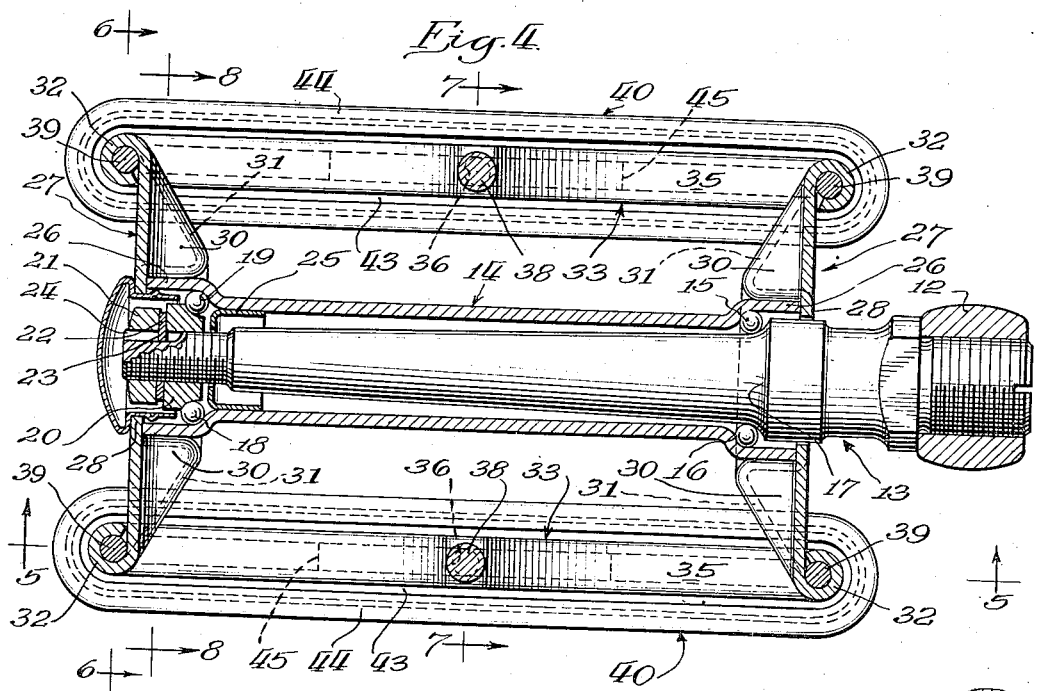
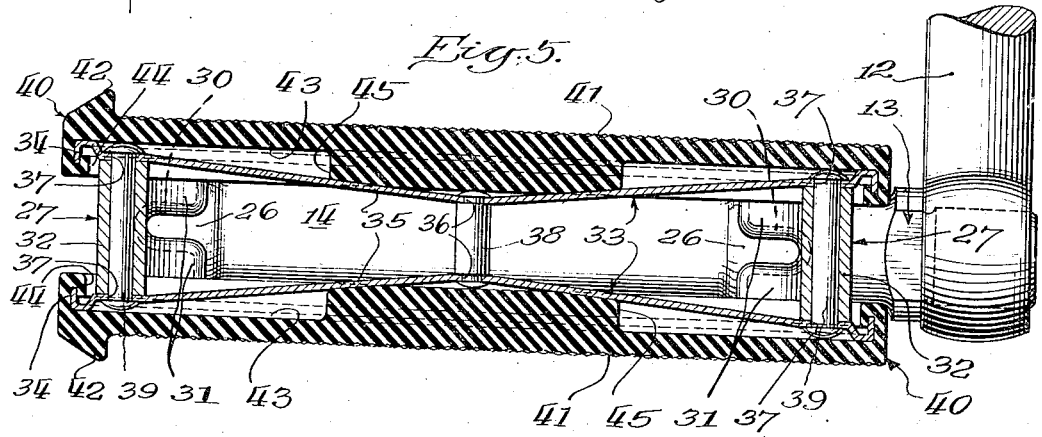
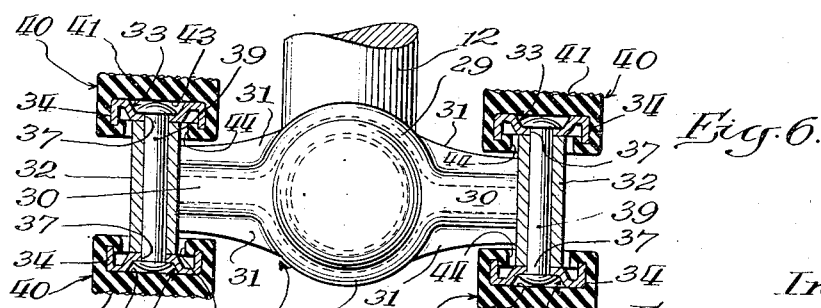
Inventor:
Frank W. Schwinn
By Williams, Bradbury,
McCaleb & Hinkle
Attys.

Nov. 7, 1939.                F. W. SCHWINN                2,178,921
                                PEDAL
                         Filed March 3, 1938          3 Sheets-Sheet 3
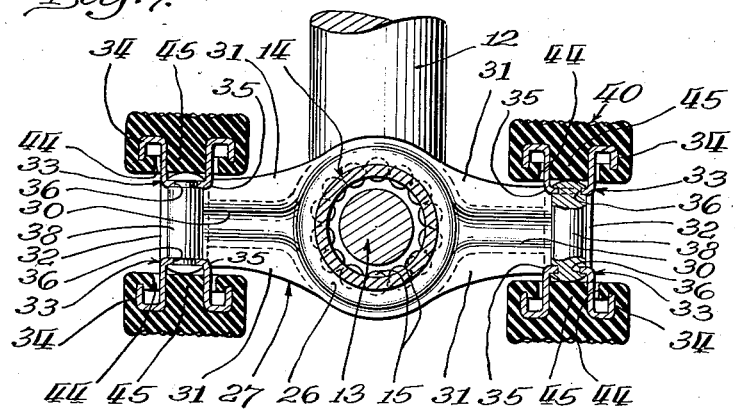
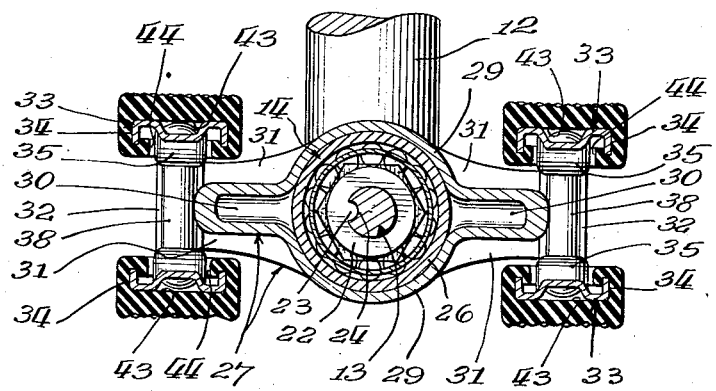
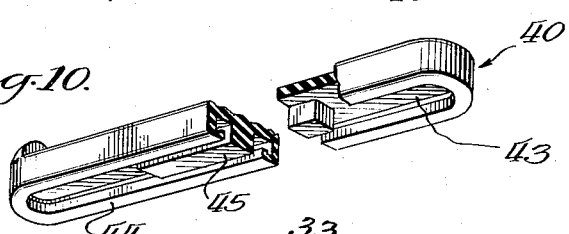
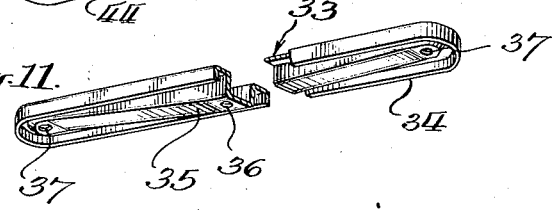
Inventor:
Frank W Schwinn
By Williams, Bradbury, McCaleb & Hinkle
Attys.

Patented Nov. 7, 1939

2,178,921

UNITED STATES PATENT OFFICE 2,178,921

PEDAL

Frank W. Schwinn, Chicago, Ill.

Application March 3, 1938, Serial No. 193,676

12 Claims. (Cl. 74—594.4)

My invention contemplates and provides certain improvements in pedals of the kind which are employed on bicycles, tricycles, etc.

A general object of my invention is to provide a pedal which is both light and strong and which is composed of elements that may be economically manufactured and easily and quickly assembled.

Another object of my invention is to provide a pedal characterized by a novel and effective species of connection between its tread plates and suitable molded rubber covers or pads for such tread plates.

A further object of the invention is to provide, in a pedal, a novel, simplified and generally improved assembly of hub, end brackets and tread plates.

Other objects, features and advantages of my invention will appear from the detailed description to follow, wherein reference is made to the accompanying drawings, in which Fig. 1 is a top plan view of a pedal constructed in accordance with the teachings of the present invention;

Fig. 4 is a horizontal sectional view, on enlarged scale, which may be regarded as taken on the line 4—4 of Fig. 2 and looking in the direction indicated by the arrows;

Fig. 5 is a vertical sectional view which may be regarded as taken on the line 5—5 of Fig. 4 and looking in the direction indicated by the arrows;

Fig. 6 is a transverse sectional view which may be regarded as taken on the line 6—6 of Fig. 4 and looking in the direction indicated by the arrows;

Figure 9:
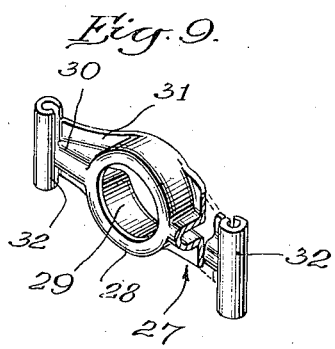
Figure 3:
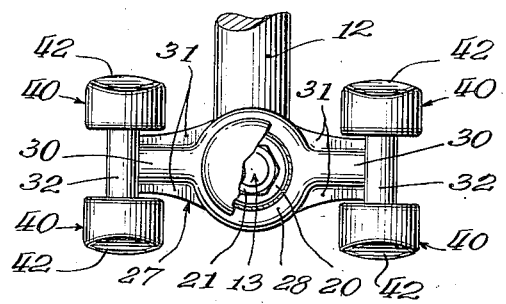
Fig. 3 is an end view of the same with a portion of the pedal bearing cap broken away to reveal parts therebehind.

Fig. 7 is a transverse sectional view which may be regarded as taken on the line 7—7 of Fig. 4 and looking in the direction indicated by the arrows;

Fig. 8 is a transverse sectional view taken on the line 8—8 of Fig. 4 and looking in the direction indicated by the arrows;

Fig. 9 (Sheet 1) is a perspective view of one of the pedal end brackets;

Fig. 10 (Sheet 3) is a perspective view, from one side and underneath of one of the tread covers or pads; and Fig. 11 is a view, similar to Fig. 10, of one of the tread plates.

Similar characters of reference refer to similar parts throughout the several views.

At 12, in several figures of the drawings, is shown a pedal crank which, at its free or pedal carrying end, is adapted for the reception and tight engagement of the threaded larger end of a tapered pedal pin 13. Disposed around, spaced from, and rotatable with respect to pin 13 is the hub or quill shaft 14. Combination radial and thrust bearings act between pin 13 and hub 14. One of these bearings comprises a series of balls 15, having as their races the opposed concave annular shoulders 16 and 17 of the hub and pin respectively. The other bearing comprises a series of balls 18 which have for their races the concave shoulder 19 of the hub and the opposed concave shoulder of a bearing cone 20. The bearing cone 20 conveniently is in the nature of a hex nut threaded upon the smaller end of pin 13 and held in properly adjusted position thereon by lock nut 21 and lock washer 22. Washer 22 may have an inwardly projecting tongue 23 which engages in an appropriate longitudinal slot 24 in the threaded smaller end of pin 13. A sleeve 25 is pressed into hub 14 to prevent balls 18 from moving inwardly of the hub beyond shoulder 19 before the cone 20, in the assembly of the pedal with shaft 14, is brought into appropriate relation to such hub shoulder.

As thus far described the pedal is or may be conventional.

It will be noted that the end portions 26 of the hub or quill shaft 14 are cylindrical, and equal in diameter, and that press fitted upon each of the said cylindrical end portions 26 is one of a pair of end brackets. Each of the end brackets is indicated as a whole by numeral 27. One of the end brackets is shown, in isolated perspective, in Fig. 9. Each of these brackets 27 is conformed, from a single piece of steel strip or sheet, to provide: the annulus 28; two opposed co-axial arcuate flanges 29 which are pressed upon one end portion 26 of the hub 14 until annulus 28 engages the end of the hub; a pair of very stiff diametrically opposite arms, each composed of a channel formation 30 and lateral flanges 31; and cylindrical sleeves 32 at the extremities of the bracket arms. Each sleeve 32, as will presently appear, constitutes a spacer for corresponding ends of a pair of tread plates and also receives a rivet whereby such ends of such tread plates are fastened to such sleeve.

Carried by and extending between the brackets 27, and serving to hold the latter against escape from the ends of the pedal hub 14, are two pairs of tread plates 33. Each of these tread plates is in the form of an elongated steel stamping which is conformed to present a continuous marginal flange 34 and an elongated dished portion 35 which is circumscribed by, and spaced from the said flange 34. (See Fig. 11.) The dished portion 35 is of varying depth, being most deep intermediate its ends and gradually diminishing in depth toward its ends. In the bottom of dished portion 35 are provided an aperture 36 and two apertures 37 for the reception of rivets to which reference presently will be made,—the aperture 36 being located intermediate the ends of the tread plate, whereas apertures 37 are located closely adjacent to the ends of the tread plate.

Figure 1:
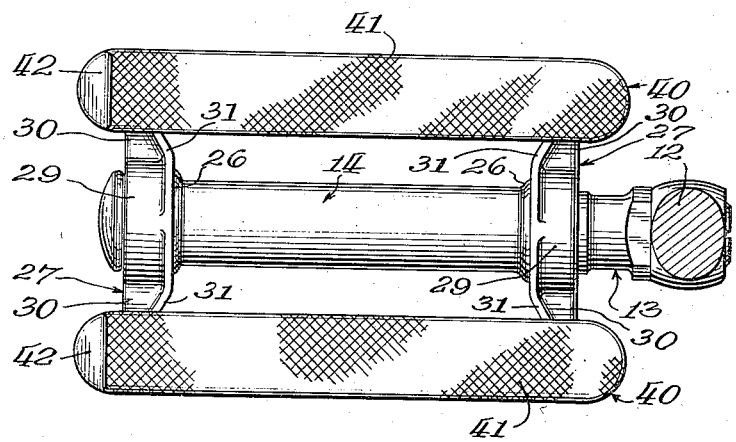
Figure 2:
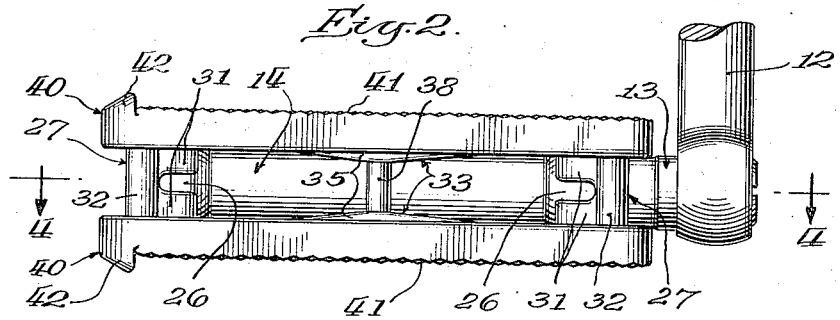
Fig. 2 is a side elevational or edge view of the same.

Each tread plate 33 of each pair presents its flange 34 toward the other tread plate of the pair, and the intermediate or most deeply dished portions of the tread plates of each pair are firmly held against any relative movement, toward or away from each other, by a spacer 38, which is preferably in the form of a double ended rivet having reduced ends which extend through the apertures 36 of the tread plates and are upset within the dished portions of the tread plates. (See Figs. 2, 5 and 7.)

It will be noted that the sleeves 32 carried by opposed or corresponding arms of the two end brackets 27 are connected by tread plates of one of the two pairs of tread plates. It also will be noted that each sleeve 32 embraces a rivet 39 which extends through the apertures 37 in those tread plate ends between which such sleeve 32 is disposed. The ends of each rivet 39 are upset within the shallow extremities of the dished portions of the tread plates with which such rivet is associated. (See Figs. 5 and 6.)

By having the flanges 29 of the end brackets 27 pressed upon the ends 26 of the pedal hub 14, by providing each of the end brackets 27 with an annulus 28 which limits movement of such bracket onto the hub, by so conforming each end bracket arm as to make it very stiff, by connecting each pair of opposed end bracket arms with a pair of elongated tread plates 33, by providing each tread plate 33 with a marginal flange 34 (and preferably with a dished portion 35 circumscribed by and spaced from such flange 34), and by interposing a connector-spacer 38 between the intermediate portions of the tread plates of each pair, I am able to provide a pedal structure which is economical to manufacture and easy to assemble, and which may be very light and at the same time surprisingly strong.

Each of the tread plates 33 is provided with a cover or pad 40 which preferably is constructed of molded soft rubber of the character customarily found on bicycle and other pedals. The obverse face 41 of such rubber cover may be roughened, as indicated in the drawings or otherwise, and projecting from one end of such obverse face may be the conventional lug 42 for engaging the edge of a shoe sole. Projecting from the reverse face 43 of such cover 40 is a continuous marginal hook-flange 44, and also projecting from such reverse face 43 is an elongated lug 45 which is circumscribed by and spaced from the hook-flange. When any one of the covers or pads 40 is applied over the concave dished surface of its associated tread plate 33, the marginal hook-flange 44 of the rubber cover engages the marginal flange 34 of the tread plate, and the elongated lug 45 of the cover is snugly seated in the dished portion 35 of the tread plate. The lug 45 of the rubber cover, projecting into the dished portion 35 of the tread plate, acts as a key which makes the detachable union between rubber cover and steel tread plate a very strong one which is not apt to be broken by any force encountered by the cover.

Having thus described and illustrated a preferred embodiment of my invention, what I claim is new and desire to secure by Letters Patent of the United States, is:

1. In a pedal and in combination with a quill shaft constituting the hub thereof, a pair of end brackets, each end bracket comprising a hub-embracing central portion which is fitted upon one end portion of the quill shaft, such central portion of each end bracket comprising a pair of opposed concave flanges press-fitted upon that end portion of the quill shaft with which such end bracket is associated, the central portion of each end bracket also comprising an annular flange arranged to engage the adjacent end of the quill shaft to determine the extent to which the end bracket may be forced upon the quill shaft, a pair of diametrically opposite arms radiating from the central portion of each end bracket, a sleeve formed at the end of each bracket arm, two pairs of elongated tread plates, the sleeves carried by corresponding arms of the end brackets being embraced by and serving as spacers for extremities of tread plates of one of such pairs, and rivets extending through said sleeves and engaging the tread plates associated therewith.

2. In a pedal and in combination with a quill shaft constituting the hub thereof, a pair of end brackets, each end bracket comprising a hub-embracing central portion which is fitted upon one end portion of the quill shaft, such central portion of each end bracket comprising a pair of opposed concave flanges press-fitted upon that end portion of the quill shaft with which such end bracket is associated, the central portion of each end bracket also comprising an annular flange arranged to engage the adjacent end of the quill shaft to determine the extent to which the end bracket may be forced upon the quill shaft, a pair of diametrically opposite arms radiating from the central portion of each end bracket, each of said arms comprising a channel portion and a pair of lateral flanges connected by said channel portion, a sleeve formed at the end of each bracket arm, two pairs of elongated tread plates, the sleeves carried by corresponding arms of the end brackets being embraced by and serving as spacers for extremities of tread plates of one of such pairs, and rivets extending through said sleeves and engaging the tread plates associated therewith.

3. In a pedal, a hub, end brackets fitted upon the extremites of such hub and provided with radiating arms, each arm of each bracket being aligned with an arm of the other bracket, two pairs of tread plates, the outer etxremity of each bracket arm serving as a spacer for and being secured to end portions of one of said pairs of tread plates, each tread plate being provided with an elongated dished portion which is deepest intermediate the ends of the tread plate, the dished portions of the tread plates of each pair extending toward each other, and spacer means interposed between and secured to the deepest dished portions of the tread plates of each pair.

4. In a pedal, a hub, end brackets fitted upon the extremities of such hub and provided with radiating arms, each arm of each bracket being aligned with an arm of the other bracket, two pairs of tread plates, the outer extremity of each bracket arm being in the form of a sleeve which serves as a spacer for end portions of one of said pairs of tread plates, rivets extending through said sleeves and cooperating with the tread plates, each tread plate being provided with an elongated dished portion which is deepest intermediate the ends of the tread plate and diminishes in depth toward the ends of the tread plate, the dished portions of the tread plates of each pair extending toward each other, and spacer means interposed between and secured to the deepest dished portions of the tread plates of each pair.

5. In a pedal, a hub, end brackets fitted upon the extremities of such hub and provided with radiating arms, each arm of each bracket being aligned with an arm of the other bracket, two pairs of tread plates, the outer extremity of each bracket arm serving as a spacer for and being secured to end portions of one of said pairs of tread plates, each tread plate being provided with a marginal flange and an elongated dished portion which is circumscribed by and spaced from such flange, the flange and dished portion of each tread plate extending toward the other tread plate of the same pair, and spacer means interposed between and secured to the dished portions of the tread plates intermediate the ends of the tread plates.

6. In a pedal, a hub, end brackets fitted upon the extremities of such hub and provided with radiating arms, each arm of each bracket being aligned with an arm of the other bracket, two pairs of tread plates, the outer extremity of each bracket arm being in the form of a sleeve which serves as a spacer for end portions of one of said pairs of tread plates, fastening means extending through said sleeves and cooperating with the tread plates, each tread plate being provided with a marginal flange and an elongated dished portion which is circumscribed by and spaced from such marginal flange, the dished portion of each tread plate being deepest intermediate the ends of the tread plate and diminishing in depth toward the ends of the tread plate, the marginal flange and dished portion of each tread plate extending toward the other tread plate of the same pair, and spacer means interposed between the deepest dished portions of the tread plates of each pair.

7. In a pedal, a hub, end brackets fitted upon the extremities of such hub and provided with radiating arms, each arm of each bracket being aligned with an arm of the other bracket, two pairs of tread plates, the outer extremity of each bracket arm serving as a spacer for and being secured to end portions of one of said pairs of tread plates, each tread plate being provided with a marginal flange and an elongated dished portion which is circumscribed by and spaced from such flange, the flange and dished portion of each tread plate extending toward the other tread plate of the same pair, spacer means interposed between and secured to the dished portions of the tread plates intermediate the ends of the tread plates, and a molded rubber cover for each tread plate, each cover comprising a marginal hook-flange and a lug which is circumscribed by and spaced from such hook-flange, such lug engaging in the dished portion of the tread plate and said hook-flange engaging the marginal flange of the tread plate.

8. In a pedal, a hub, end brackets fitted upon the extremities of such hub and provided with radiating arms, each arm of each bracket being aligned with an arm of the other bracket, two pairs of tread plates, the outer extremity of each bracket arm being in the form of a sleeve which serves as a spacer for end portions of one of said pairs of tread plates, fastening means extending through said sleeves and cooperating with the tread plates, each tread plate being provided with a marginal flange and an elongated dished portion which is circumscribed by and spaced from such marginal flange, the dished portion of each tread plate being deepest intermediate the ends of the tread plate and diminishing in depth toward the ends of the tread plate, the marginal flange and dished portion of each tread plate extending toward the other tread plate of the same pair, spacer means interposed between the deepest dished portions of the tread plates of each pair, and a molded rubber cover for each tread plate, each cover comprising a marginal hook-flange and a lug which is circumscribed by and spaced from such hook-flange, such lug engaging in the dished portion of the tread plate and said hook-flange engaging the marginal flange of the tread plate.

9. A pedal of the type including a hub, a pair of end brackets centrally supported at the ends of the hub, and treads joining the extremities of said end brackets, characterized by treads consisting of a tread plate provided with a marginal flange, and a deep centrally located socket portion, and a relatively soft molded pad enveloping the concave surface of said plate provided with a marginal hook flange enveloping the marginal flange of the tread plate, and a heavy lug extending into and tightly engaging the socket within said tread plate.

10. A pedal of the type including a hub, a pair of end brackets centrally supported at the ends of the hub, and treads joining the extremities of said end brackets, characterized by treads consisting of a tread plate provided with a marginal flange, recessed apertures for fastenings, and a deep centrally located socket portion, and a relatively soft molded pad enveloping the concave surface of said plate provided with a marginal hook flange enveloping the marginal flange of the tread plate and said aperture, and a heavy lug extending into and tightly engaging the socket within said tread plate.

11. A pedal of the type including a hub, a pair of end brackets centrally supported at the ends of the hub, and treads joining the extremities of said end brackets, characterized by treads consisting of a dished tread plate, a relatively soft molded pad enveloping one surface of said plate, marginal means carried by said pad for enveloping the edges of said plate, and means integral with said pad extending into and tightly engaging the dished portion of said plate.

12. A pedal of the type including a quill shaft hub, two pairs of tread plates, and means for supporting the tread plates in spaced, parallel relationship upon said hub, characterized by a pair of end brackets comprising a central annulus adapted to fit snugly upon the end of a quill shaft, a pair of diametrically opposite arms integral with said central annulus, having a corrugated cross section, and a pair of substantially cylindrical spacing members for the tread plates formed integral with said arms and at right angles to the axis of the hub.

FRANK W. SCHWINN.